Nov. 21, 1950        B. J. DONOHUE, JR        2,530,381

COUPLING FOR ARMORED CABLE

Filed Jan. 22, 1946

INVENTOR.
BERNARD J. DONOHUE JR.
BY M. O. Hayes

ATTORNEY

Patented Nov. 21, 1950

2,530,381

UNITED STATES PATENT OFFICE 2,530,381

COUPLING FOR ARMORED CABLE

Bernard J. Donohue, Jr., Stonehurst, Pa.

Application January 22, 1946, Serial No. 642,782

10 Claims. (Cl. 174—18)

(Granted under the act of March 3, 1883, as amended April 30, 1928; 370 O. G. 757)

This invention relates to packing rings and more particularly to a novel combination of a packing ring and cable fitting adapted to be used for electrical connections.

In inserting armored cable to a connecting box housing electrical connections, the primary concerns of the electrician making the connection are good insulation and adequate protection of the cable from stress at the soldered or wired connections. The armored cable generally consists of a plurality of conductors insulated from one another and housed in a metal (hence armored) cable. In inserting the cable into the connecting box, it is imperative to guard the conductors from contacting water or other liquid that will short or trim the electrical connections within the connecting box. Also, the insertion must be made in such a fashion that any strain placed on that portion of the cable outside of the connecting box will not be transmitted to the soldered, wired, or bolted connection within the connecting box.

It is an object of the present invention to provide a novel cable fitting that will insure an efficient water-tight insulation of the cable conductors.

Another object is to provide a novel cable fitting that will adequately relieve the pressure on the electrical connection points.

Another object is to provide a cable fitting that will simultaneously be a locking means and an electrical protecting means for the cable connection.

Figure 1:
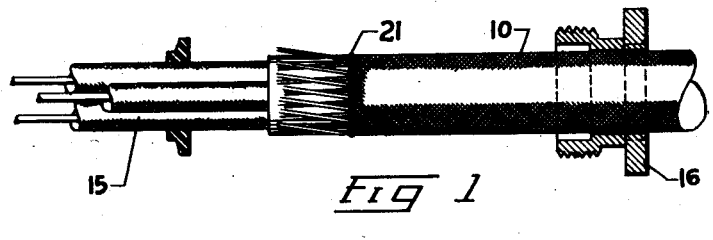
Figure 2:
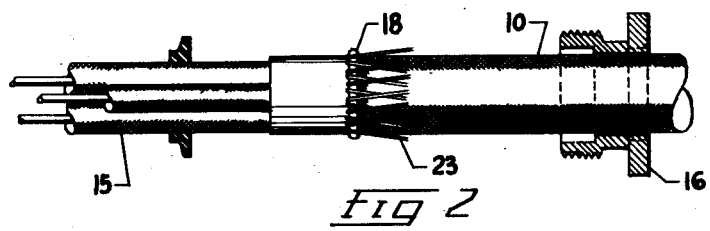
Figure 3:
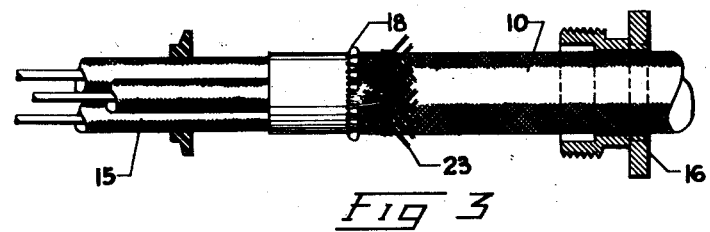

Further objects and advantages of this invention, as well as its construction, arrangement and operation, will be apparent from the following description and claims in connection with the accompanying drawing, in which Figs. 1, 2 and 3 show the preliminary steps in the preparation of armored cable prior to connecting the conductors of the cable to the leads in a connecting box.

Figure 4:
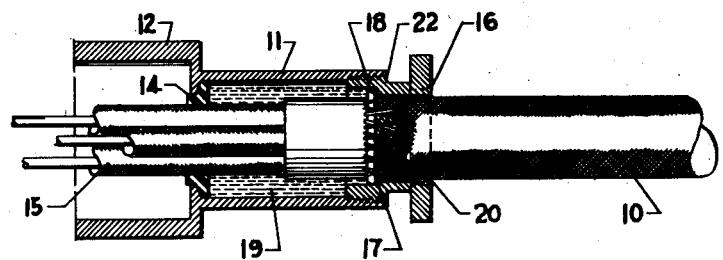

Fig. 4 is a vertical cross-sectional view of the present cable fitting shown engaged to a connection box.

In Fig. 4 there is shown an armored cable 10 that is housed in a tube or stuffing box 11, the latter being an extension of the connecting box 12 which usually houses a plurality of electrical leads or electrical connecting posts. A phenol disk 14, or other suitable non-conducting plug well-known to the electrical art, supports the insulated conductors 15 and prevents contact between the conductors 15 and the connecting box 12. The gland nut 16 is threadedly engaged with the tube 11, until the shoulder 17 of the gland nut 16 abuts against the ring 18 that girdles the armored cable 10.

The cavity 19 is filled with a non-conducting viscous water-repellant substance, the surplus of which oozes out through the slight space 20 between the armored cable 10 and the gland nut 16. The surplus water-repellant substance is built up about the head of the gland nut 16 and upon being exposed to the air hardens sufficiently so as to keep the cavity 19 well lubricated and waterproofed.

The first three figures illustrate the operations performed on the armored cable 10 in preparation for its insertion into the connecting box 12. When the cable is ready to be cut at one end, the cable is brought up to the tube 11 in the desired sweep. The gland nut 16 is removed and made to lie at a point along the cable 10 while a few turns of wire 21 are tied around the armored cable at a point equal to the length of cable that is to extend inward of the edge 22 of the tube 11. The metal ring 18 is placed on the armored cable 10 using the wire 21 as a guide, and the portion of the cable that lies forward or inward of the ring 18 is frayed; the frayed strands 23 are bent over the ring 18, and secured to the cable as shown in Fig. 3. The surplus frayed ends are snipped off and the cable fitting is made fast to the connecting box as described. As a precautionary measure, after the conductors have been soldered, wired, or otherwise secured to the electrical ports or leads within the connecting box 12, the cable 10 is pulled taut so that when the shoulder 17 is snubbed against the ring 18 by the turning of the gland nut 16, there will be ample space between the phenol plug 14 and the ring 18, assuring a good watertight seal.

The cable fitting described has the advantage of permitting a rapid insertion of the cable to the connection box. Moreover, by using the ring 18 in the manner described and shown, it is used not only as a means for taking the strains placed upon the cable that is outside of the connection box, but also in the metallic conductor that is the electrical ground for the cable; the circuit going from the cable 10 to the ring 18, through the tube 11, through the connection box 12, then to the wall or bulkhead to which the connection box 12 is attached. This present arrangement eliminates the use of a metal packing for electrically grounding the armor or sheath of cable 10 and also assures a proper spacing between the armored portion of the cable within the tube 11 and the face of the phenol disk 14. Since the ring 18 is snugly engaged to the walls of the gland nut 16, a tight-fitting seal is constantly maintained within the cavity 19.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. The combination for a coupling connecting armored cable to a connection box, of a stuffing box, an armored cable, a ring of arcuate radial cross section girdling said cable, a gland nut girdling said cable and detachably engageable to the stuffing box, and a shoulder near the forward portion of said gland nut and adapted to exert a force having substantially zero radial component against said metallic ring.

2. The combination for a coupling connecting electrical conductors housed in a metallic envelope to a suitable connection box, of a stuffing box, an armored cable, a metallic ring of circular radial cross section snugly girdling the armored cable at a predetermined distance along the length of the cable, openings in said stuffing box for receiving the partially sheathed portion of said armored cable that lies forward of the metallic ring, a gland nut encircling the armored cable and engageable to the stuffing box, and a radially extending bearing face on said gland nut, whereby said gland nut may be secured to the stuffing box until the bearing face abuts against the metallic ring exerting axial pressure thereagainst.

3. In a coupling for connecting armored cable to a connecting box, the combination of a stuffing box adapted to be filled with a water-resistant material and to receive an armored cable therein, a metallic ring disposable about said cable at a predetermined distance along its length, a gland nut also disposable about said cable and detachably engaged to the stuffing box, a shoulder near the forward edge of said gland nut and adapted to abut against said metallic ring, and means in said gland nut providing egress for said water-resistant material, whereby upon tightening of said nut, the water-resistant material is forced out through said egress and on to the exposed part of said cable.

4. In combination, a stuffing box adapted to receive an armored cable therein, said cable having a metallic ring fixedly secured thereto, a gland nut slidable along the armor of said cable and adapted to be detachably engaged with said stuffing box, said gland nut having a smooth bore portion of enlarged inner diameter and defining a bearing surface extending perpendicularly to the axis of said nut whereby, upon securing said nut to said stuffing box, said bearing surface abuts said metallic ring and exerts axial pressure only thereon.

5. A coupling arrangement for connecting armored cable to a connection box, comprising a ring member girdling said cable, part of the armor being frayed and folded back over said ring member, means securing said folded-back part to the cable, a gland nut slideable on the armor of said cable and detachably connectable to the box, and a shoulder formed adjacent the forward part of said gland nut and adapted to exert axial stress on said ring member thereby to place said armor under longitudinal strain.

6. The combination, in a coupling for connecting armor cable to a connection box, of a metallic ring girdling said cable, part of the armor being folded back on itself and over said ring, means securing said folded-back part in such position, a gland nut girdling said cable and detachably engaged to the box, and a shoulder in said gland nut adapted to exert a force having substantially zero radial component against said ring, whereby upon engagement of said nut and box, the armor is exposed to longitudinal stress.

7. The combination comprising a stuffing box, an armor cable adapted to be telescopically received in said box, a ring member slideable on armor of said cable, a gland nut having a first part adjacent to and slideable on the armor and a second part having a smooth enlarged bore defining with said first part a shoulder, means on said second part for detachably connecting said nut to said box, whereby upon tightening said nut, said shoulder bears axially on said ring member.

8. The combination defined in claim 7 wherein the armor is frayed at the end and folded back over said ring member, whereby the armor is maintained under longitudinal strain when said shoulder bears on said ring member.

9. In combination, a stuffing box adapted to receive an armored cable, said cable having a metallic ring fixedly secured thereto, a gland nut slidable along the armor of said cable and adapted to be detachably engaged with said stuffing box, said gland nut having a smooth bore portion of enlarged diameter and defining a bearing surface extending perpendicularly to the axis of said nut, whereby on securing said nut to said stuffing box, said smooth bore portion passes freely over said metallic ring and said bearing surface abuts said metallic ring exerting axial pressure only thereon.

10. A fluid-tight seal for armor-encased conductors, comprising a tubular housing having apertured partition means dividing said housing into aligned chambers, one thereof being adapted to contain a viscous material, said one chamber having an open end for admitting an armor conductor, insulating spacer means in the aperture of said partition means for supporting the conductor in fluid-tight relation, and clamping means at the open end of said one chamber and including means defining a vent for passing part of the viscous material therethrough and onto the armor of the conductor exteriorly adjacent said chamber, thereby to effect a fluid-tight seal.

BERNARD J. DONOHUE, Jr.

REFERENCES CITED

The following references are of record in the file of this patent:

UNITED STATES PATENTS

| Number | Name | Date |
|---|---|---|
| 1,103,130 | Cunningham et al. | July 14, 1914 |
| 1,137,931 | Traver et al. | May 4, 1915 |
| 1,459,047 | Crossley | June 19, 1923 |
| 2,208,558 | Appleton | July 23, 1940 |
| 2,402,840 | Olley | June 25, 1946 |
| 2,475,787 | Kelsay | July 12, 1949 |